United States Patent
Li et al.

(10) Patent No.: US 8,385,695 B2
(45) Date of Patent: Feb. 26, 2013

(54) OPTICAL FIBER IMAGING SYSTEM AND METHOD FOR GENERATING FLUORESCENCE IMAGING

(75) Inventors: Ming-Jun Li, Horseheads, NY (US);
Shenping Li, Painted Post, NY (US)

(73) Assignee: Corning Incorporated, Corning, NY (US)

(*) Notice: Subject to any disclaimer, the term of this patent is extended or adjusted under 35 U.S.C. 154(b) by 511 days.

(21) Appl. No.: 12/623,973

(22) Filed: Nov. 23, 2009

(65) Prior Publication Data

US 2011/0121202 A1    May 26, 2011

(51) Int. Cl.
*G02B 6/26* (2006.01)
*G01J 1/58* (2006.01)
(52) U.S. Cl. ............... 385/27; 250/459.1; 250/458.1
(58) Field of Classification Search .................. None
See application file for complete search history.

(56) References Cited

U.S. PATENT DOCUMENTS

| | | | |
|---|---|---|---|
| 5,464,013 A | 11/1995 | Lemelson | |
| 5,769,787 A | 6/1998 | Lemelson | |
| 6,570,659 B2 | 5/2003 | Schmitt | |
| 7,019,309 B2 | 3/2006 | Gu et al. | |
| 7,242,833 B2 | 7/2007 | Yang et al. | |
| 7,511,891 B2 | 3/2009 | Messerschmidt | |
| 7,551,809 B2* | 6/2009 | Taira et al. | 385/1 |
| 2002/0131049 A1 | 9/2002 | Schmitt | |
| 2004/0061072 A1 | 4/2004 | Gu et al. | |
| 2004/0076390 A1 | 4/2004 | Dong Yang et al. | |
| 2007/0213618 A1 | 9/2007 | Li et al. | |
| 2008/0013900 A1 | 1/2008 | Harris | |
| 2008/0080060 A1 | 4/2008 | Messerschmidt | |
| 2008/0205833 A1 | 8/2008 | Fu et al. | |
| 2008/0285913 A1 | 11/2008 | Yang et al. | |

FOREIGN PATENT DOCUMENTS

| | | |
|---|---|---|
| EP | 1299711 | 5/2006 |
| WO | WO 0204929 | 1/2002 |
| WO | WO 2008130866 | 10/2008 |
| WO | WO 2008144831 | 12/2008 |

OTHER PUBLICATIONS

Myaing, Mon Thiri; MacDonald, Daniel J.; and Li, Xingde, "Fiber-Optic Scanning Two-Photon Fluorescence Endoscope," Optics Letters, vol. 31, No. 8, Apr. 15, 2006, pp. 1076-1078.

Fu, Ling; Gan, Xiaosong; and Gu, Min, "Nonlinear Optical Microscopy Based on Double-Clad Photonic Crystal Fibers," Optics Express, vol. 13, No. 14, Jul. 11, 2005, pp. 5528-5534.

Fu, Ling; Jain, Ankur; Xie, Huikai; Cranfield, Charles; and Gu, Min, "Nonlinear Optical Endoscopy Based on a Double-Clad Photonic Crystal Fiber and a MEMS Mirror," Optics Express, vol. 14, No. 3, Feb. 6, 2006, pp. 1027-1032.

(Continued)

*Primary Examiner* — Sarah Hahm
(74) *Attorney, Agent, or Firm* — Robert L. Carlson

(57) ABSTRACT

A nonlinear fluorescence imaging system and method for generating fluorescence imaging includes a pulsed laser source for generating laser pulses at a first wavelength and an optical pulse stretcher including one or more optical pulse stretcher fibers having a first dispersion parameter at the first wavelength. The system also includes a probe for interfacing with a sample to deliver the laser pulses and extract fluorescence signals excited in the sample. One or more optical delivery fibers are included for delivering the laser pulses and collecting nonlinear fluorescence signals. The optical delivery fiber has a second dispersion parameter at the first wavelength which is opposite a polarity of the first dispersion parameter. A detector detects images based on the collected fluorescence signals.

20 Claims, 8 Drawing Sheets

OTHER PUBLICATIONS

Myaing, Mon Thiri; Urayama, Junji; Braun, Alan; and Norris, Theodore B., "Nonlinear Propagation of negatively Chirped Pulses: Maximizing the Peak Intensity at the Output of a Fiber Probe," Optics Express, vol. 7, No. 5, Aug. 28, 2000, pp. 210-214.

König, K.; Becker, T.W.,; Fischer, P.; Riemann, I.; and Halbhuber, K.-J., "Pulse-length Dependence of Cellular Response to Intense Near-Infrared Laser Pulses in Multiphoton Microscopes," Optics Letters, vol. 24, No. 2, Jan. 15, 1999, pp. 113-115.

Theer, Patrick; Hasan, Mazahir T.; and Denk, Winfried, "Two-Photon Imaging to a Depth of 1000 μm in Living Brains by Use of a Ti:$Al_2O_3$ Regenerative Amplifier," Optics Letters, vol. 28, No. 12, Jun. 15, 2003, pp. 1022-1024.

* cited by examiner

OPTICAL FIBER IMAGING SYSTEM AND METHOD FOR GENERATING FLUORESCENCE IMAGING

BACKGROUND

The disclosure generally relates to fluorescence imaging, and more particularly relates to a nonlinear fluorescence imaging system and method employing optical fibers.

Nonlinear fluorescence imaging is a powerful imaging modality offering unique characteristics that can provide useful imaging information. Nonlinear fluorescence is generally achieved where laser pulses generated by a pulsed laser excite fluorescence in a target sample. The nonlinear fluorescence intensity is detected and processed to acquire imaging information. Nonlinear fluorescence imaging may be particularly useful for microscopy and endoscopy. Nonlinear microscopy includes intrinsic optical sectioning ability due to nonlinear excitation process, deeper penetration depth into tissue because of the excitation light, and reduced photobleaching and phototoxicity in the out-of-focus regions due to the general confinement of fluorescence excitation to the focal region.

Proposed fluorescence imaging systems typically use complicated pulsed lasers and bulk optics. Some proposed imaging systems may employ fiber optics, however, conventional optical fiber based imaging systems typically suffer from degradation of the laser pulses due to nonlinear effects in the optical fiber which limits the imaging resolution, depth and speed. In addition, because of the tradeoff between the image depth and the scanning speed, typically only one parameter is optimized in proposed systems.

SUMMARY

According to one embodiment, a fluorescence imaging system is provided. The system includes a pulsed laser source for generating laser pulses at a first wavelength. The system also includes an optical pulse stretcher comprising at least one optical pulse stretcher fiber having a first dispersion parameter at the first wavelength. A probe is provided for interfacing with a sample to deliver the laser pulses and extract fluorescence signals excited by the laser pulses in the sample. The system further includes at least one optical delivery fiber for delivering the laser pulses to the probe for delivery to the sample and collecting nonlinear fluorescence signals extracted from the sample by the probe. The optical delivery fiber has a second dispersion parameter at the first wavelength, and the second dispersion parameter has a polarity opposite the first dispersion parameter. The system further includes a detector for detecting images based on the collected fluorescence signals.

A method for generating fluorescence imaging is provided in accordance with the method described above. The method includes the steps of generating laser pulses at a first wavelength with a pulsed laser, and chirping the laser pulses with at least one optical pulse stretcher comprising an optical stretcher fiber having a first dispersion parameter at the first wavelength. The method also includes the step of delivering the laser pulses to a sample with at least one optical delivery fiber having a second dispersion parameter at the first wavelength to excite the sample, wherein the second dispersion parameter has a polarity opposite the first dispersion parameter. The method further includes the steps of collecting nonlinear fluorescence signals excited in the sample, and delivering the collected fluorescence signals with the optical delivery fiber to a detector.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
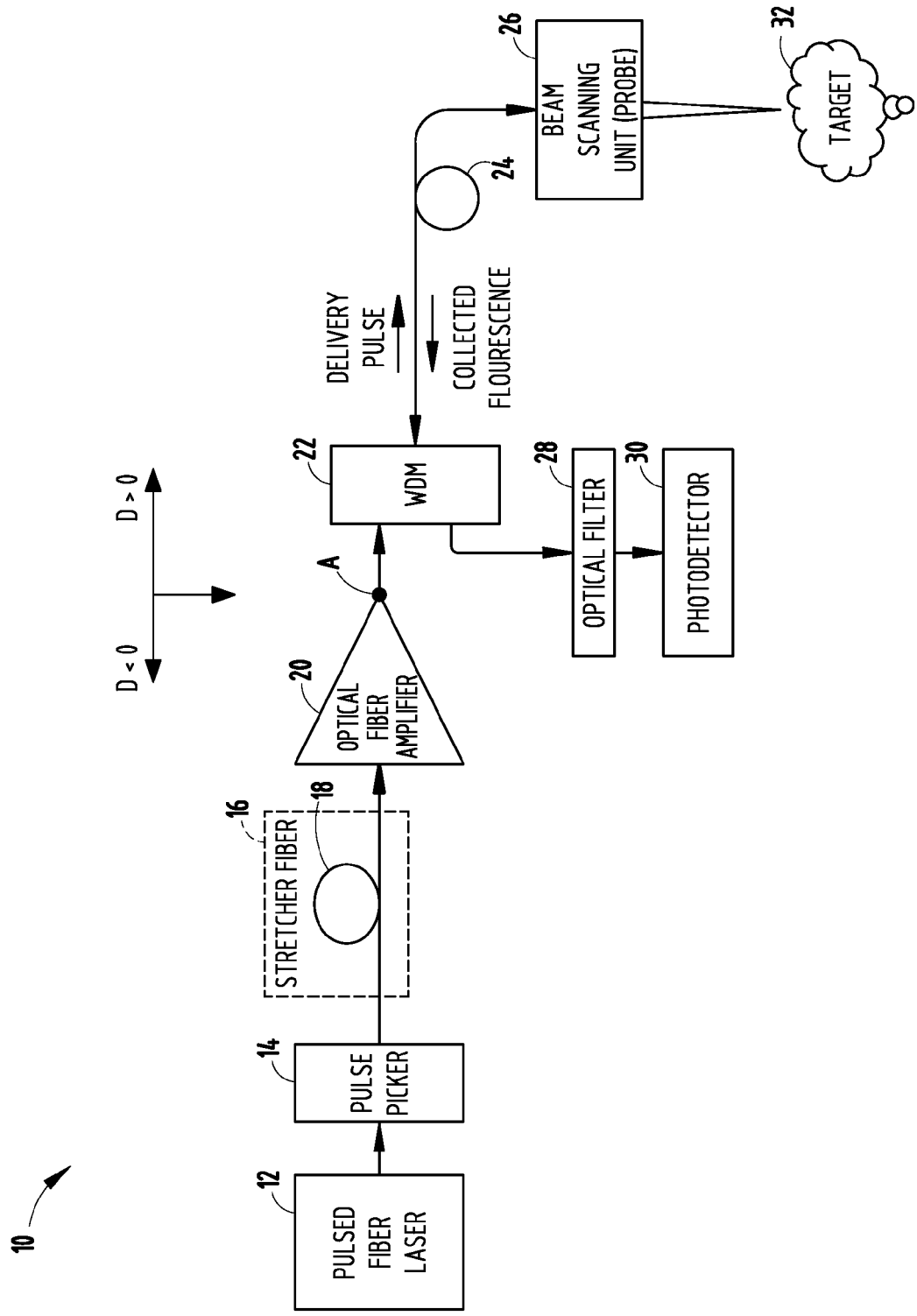
FIG. 1 is a schematic diagram of an optical fiber nonlinear fluorescence imaging system, according to a first embodiment.

Reference will now be made in detail to the present preferred embodiments, examples of which are illustrated in the accompanying drawings. Whenever possible, the same reference numerals will be used throughout the drawings to refer to the same or like parts. The fluorescence imaging system is shown in FIG. 1 according to one embodiment, and is designated generally throughout by the reference number 10. Other embodiments of the fluorescence imaging system are likewise designated by reference number 10 having various features as shown and described herein.

The fluorescence imaging system 10 shown and described herein is an optical fiber based nonlinear fluorescence imaging system that efficiently delivers high power short laser pulses to a target sample with suppressed pulse degradation to ensure high excitation efficiency of nonlinear optical signals to effectively realize a high signal-to-noise ratio. The peak power and repetition rate of the laser pulses delivered to the target sample can be adjusted which allows the imaging system 10 to be able to achieve a deep imaging depth while maintaining a short measurement time. In the disclosed embodiments, the imaging system 10 is substantially all fiber-based, is cost-effective, compact in size, offers high reliability and is substantially alignment-free.

Referring to FIG. 1, the fluorescence imaging system 10 is generally shown in a schematic having fiber based components for detecting an image of a target sample 32, according to a first embodiment. The fluorescence imaging system 10 includes a pulsed fiber laser source 12 for generating laser pulses at a first wavelength. Imaging system 10 may also include an optical pulse picker 14 coupled to the output of pulsed fiber laser source 12 for adjusting, such as discretely reducing, the repetition rate of the output laser pulses of the pulsed fiber laser source 12. The imaging system 10 also includes an optical pulse stretcher 16 having a stretcher fiber 18 to stretch the output pulses of the pulse fiber laser 12. The imaging system 10 may include an optical fiber amplifier 20 that amplifies the output of the stretcher 16 and provides an output shown at point A. The imaging system 10 may further include a wavelength division multiplexer (WDM) 22 receiving as an input the output of amplifier 20 and coupled to an optical pulse delivery fiber 24. The pulse delivery fiber 24, in turn, is connected to an optical beam scanning unit or probe 26 which interfaces with the target sample 32. The wavelength division multiplexer 22 also provides an output from the delivery fiber 24 to an optical filter 28 that filters the received fluorescence signals and provides the filtered signals to a detector, shown as a photodetector 30, which acquires the nonlinear fluorescence signals and detects images based on the collected fluorescence signals.

The pulsed fiber laser source 12 may include a mode-locked ultrashort pulse fiber laser that generates transform-limited laser pulses with a pulsewidth in the regime of 30 femptoseconds (fs)-10 picoseconds (ps) according to one embodiment, and in the regime of 30 to 300 fs according to another embodiment, at a repetition rate in the range of 1 megahertz (MHz) to 200 megahertz (MHz) according to one embodiment, and in the regime of 1 to 50 MHz according to another embodiment. The pulsed fiber laser source 12 may operate at a wavelength in the range of about 800 nanometers (nm) to 2 micrometers (μm) according to one embodiment, and in the range of 800 nm to 1.6 μm according to another embodiment. According to various embodiments, the pulsed fiber laser 12 may operate at specific wavelengths of about 850 nm, 1060 nm, 1310 nm, and 1550 nm, as determined by a gain medium. The gain medium of the laser source 12 can be a fiber doped with a rare earth element, such as Yb, Nd, Er, Tm or a semiconductor amplifier made of III-V compound semiconductors such as GaAs/AlGaAs, InP/InGaAs, InP/InGaAsP and InP/InAlGaAs. It should be appreciated that one or more other lasers or fluorescence generating illumination sources may be employed to generate the light signals for exciting fluorescence in the target sample 32.

The optical pulse picker 14 is employed to discretely reduce the repetition rate of the output pulses of the pulsed fiber laser 12. According to one embodiment, the optical pulse picker 14 may include a fiber acousto-optic modulator. The optical pulse picker 14 is shown in one embodiment as a discrete component separate from the pulsed fiber laser source 12, however, it should be appreciated that the pulse picker function of discretely reducing the repetition rate of the output laser pulses may be integrated into the pulsed fiber laser source 12, according to another embodiment.

The optical pulse stretcher 16 is shown formed of or including at least one optical fiber 18 used to stretch the output laser pulses of the pulse fiber laser source 12. The optical fiber 18 may be implemented as a fiber component. The optical pulse stretcher 16 may be implemented in one embodiment by a piece of single mode optical fiber 18 configured with a negative dispersion parameter (D<0) at the first wavelength of the laser pulses. The polarity of the dispersion of the optical stretcher fiber 18 is negative at the first wavelength in the embodiment shown, such that the total dispersion prior to (to the left of) point A has a polarity opposite to the total dispersion after (to the right of) point A. In addition, an optical attenuator (not shown) may be employed at the input of the stretcher 16, or alternately at the pulse picker 14, to optimize the pulse power to avoid having too much nonlinear effects in the stretcher fiber 18 and the optical fiber amplifier 20 that follows. Because of the negative dispersion parameter (D<0) of the stretcher fiber, the long wavelength components of the laser pulses travel faster than the short wavelength components in the stretcher fiber. When ignoring nonlinear effects in the stretcher fiber, the amount of pulse broadening is given by $\Delta t = D * L_S * \Delta \lambda$ where $L_S$ is the length of the stretcher fiber, $\Delta \lambda$ is the spectral width of the laser pulses.

The stretched laser pulses are sent to the optical fiber amplifier 20. The optical fiber amplifier 20 is employed to optimize the power and width of the laser pulses to be delivered to the target sample 32 with different pulse repetition rates.

The output of amplifier 20 is input to the wavelength division multiplexer 22 which, in turn, is coupled to the optical pulse delivery fiber 24. The WDM 22 may be fiber based such that it is either made of optical fibers or is pigtailed with optical fibers. The WDM 22 and delivery fiber 24 are used for pulse delivery and nonlinear fluorescence signal collection. The delivery fiber 24 may have a double clad fiber structure comprising a single mode core, an inner clad and an outer clad according to one embodiment. The single mode core is used to deliver laser pulses and the inner clad is used to collect nonlinear fluorescence signal. To ensure a high collection efficiency of collected nonlinear fluorescence signal, the numerical aperture of the inner clad of the delivery fiber is preferably greater than 0.2, more preferably greater than 0.3. The WDM 22 allows the laser pulses at the first wavelength that are delivered to the target sample 32 to propagate in the delivery fiber 24 without interfering with the fluorescence signals of a different second wavelength that are collected from the sample 32. The fluorescence signals may have a second wavelength that is approximately one-half the first wavelength, according to one embodiment. The optical pulses at the first wavelength are delivered to the probe, which may be a beam scanning unit 26. The collected fluorescence signals are then transmit to the optical filter 28 which filters the collected fluorescence signals. The filtered signals are passed onto a detector system, such as photodetector 30, for detecting images based on the collected fluorescence signals. The beam scanning unit or probe 26 may include a conventional probe that allows for the laser pulses delivered via delivery fiber 24 to be delivered to the target sample 32. The probe 26 also collects the fluorescence signals from the target sample 32 so that the collected fluorescence signals are delivered via the delivery fiber 24 and WDM 22 to the photodetector 30.

In the embodiment shown and described herein, all of the optical fibers used in the components of system 10 prior to point A are single mode at the pulsed laser first wavelength, and have a negative total dispersion at the first wavelength. The fiber used in the wavelength division multiplexer 22 and the delivery fiber 24 are both single mode and have a positive total dispersion at the first wavelength. Accordingly, the total dispersion for the components prior to point A is of an opposite polarity to the total dispersion for the optical fiber components after point A. Dispersion is also referred to as chromatic dispersion in the art. The units of total dispersion are ps/nm-km.

The operation of the fluorescence imaging system 10 shown in FIG. 1 will now be described as follows. The pulsed fiber laser source 12 generates transform-limited laser pulses having a pulsewidth, a repetition rate, and a first wavelength. The optical pulse picker 14 discretely reduces the repetition rate of the output pulses of the pulsed fiber laser source 12. The ultrashort transform-limited pulses are positively chirped by using the optical pulse stretcher 16 with dispersion having a negative polarity (D<0) at the first wavelength to avoid pulse degradation due to nonlinear effects in the delivery fiber 24. By properly choosing the dispersion of the stretcher 16 and properly controlling the output power of the pulsed laser source 12, laser pulses with different energy levels can be extracted from the optical amplifier 20 while the linear pulse propagation is kept in the fibers of the pulse picker 14, stretcher 16, and amplifier 20. Because the dispersion of pulse delivery fiber 24 has a polarity opposite to that of the stretcher 16 and the fiber of the pulse picker 14, if the delivery fiber 24 is long enough, the chirp of the laser pulses can be compensated at a fiber location where the accumulated positive dispersion is the same as the total negative dispersion of the stretcher 16 (and the fiber of the pulse picker 14). If the pulse peak power of the amplifier 20 output is properly controlled, such that the fundamental soliton condition can be met, the pulses evolve into fundamental soliton pulses in the delivery fiber 24. Accordingly, high energy (1 kW to 10 MW) ultrashort (30 to 300 fs) pulses can be delivered to the target sample 32 without pulse degradation. If the pulse energy is further increased, high-order soliton pulses can be formed in the delivery fiber 24. By properly choosing the delivery fiber 24 length or the pulse energy of the amplifier 20 output, compressed ultrashort pulses can be obtained at the output of the delivery fiber 24. The resultant pulsewidth of the output pulses may be even shorter than that of the output pulses of the pulse laser 12. The peak power $P_{N-1}$ required to support the Nth order soliton may be defined as set forth in the following equation:

$$P_{N-1} = N^2 P_0 = N^2 \frac{\lambda^3 D A_{\text{eff}}}{1.28\pi^2 c n_2 \tau^2}$$

where N is the soliton order, N=1 is fundamental soliton, $P_0$ is the peak power for the fundamental soliton, $\lambda$ is the center wavelength of the pulses, D is the fiber dispersion parameter, $A_{\text{eff}}$ is the effective core area of the fiber, c is light velocity in a vacuum, $n_2$ is a nonlinear refractive index of fiber core material, and $\tau$ is the pulsewidth (the full width at half maximum). The higher the order of soliton, the higher the pulse peak power (or pulse energy when the pulsewidth is fixed) that is required. Therefore, the pulse energy at the output of the delivery fiber 24 can be increased by exciting higher orders of soliton.

The fluorescence imaging system 10 is designed to handle the tradeoff between the image depth and the scanning speed by adjusting the peak power and repetition rate of the laser pulses. For two-photon fluorescence imaging, the maximum imaging depth $d_{max}$ for a given average power $P_{avg}$ may be defined by the following equation:

$$d_{max} = l_s \ln\left[\eta \frac{P_{avg}}{\sqrt{f\tau}}\right],$$

with $$\eta = [\eta_2 \phi(d_{max}) / P_{avg}(d_{max})]^2$$

where $l_s$ is the scattering mean-free-path length, $\eta_2$ is the fluorescence quantum efficiency under two-photon excitation and $\phi(d_{max})$ and $P_{avg}(d_{max})$ are the collection efficiency and the required average excitation power at the focal plane, respectively, and f is pulse repetition rate. Cell damage behavior has been found to follow approximately a $P_{avg}^2/\tau$ dependence. Based on the above equations, the maximum image depth $d_{max}$ can be improved by reducing the repetition rate of the laser pulses. The repetition rate may be in the range of 1 to 200 MHz, according to one embodiment. However, the lowest usable repetition frequency is limited by the pixel rate (typically ranging from 50 kHz to several megahertz) since at least one laser pulse must be delivered per image pixel. A tradeoff exists typically between increasing the image depth and increasing the image scanning speed. Additionally, with only one or at most a small number of pulses per pixel, synchronization becomes essential, since the variation in pulse number per pixel (by one pulse without synchronization) is fractionally large. The fluorescence imaging system 10 addresses this issue by using different pulse repetition rates to image different deep layers (the deeper the layer, the lower the pulse repetition rates and the higher the peak power). The different repetition rates may be achieved by changing the repetition rate with the laser 12 or with the pulse picker 14. With the laser 12, the repetition rate may be changed by changing the cavity length which is inversely proportion to the repetition rate. With the pulse picker 14, a photodetector may be used to convert a part of the pulsed laser output into an electrical pulse signal and an electrical divider may be used to adjust the repetition rate of the electrical pulses. The adjusted electrical pulse signal is then sent to a pulse picker driver to change the repetition rate of the optical pulses. Thus, the image depth can be maximized while keeping a short total scanning time for taking a three-dimensional (3D) image.

In the embodiment of the fluorescence imaging system 10 shown in FIG. 1, the pulse repetition rate is adjusted by using the optical pulse picker 14. For a given average pulse power, the pulse energy increases with a decrease of the pulse repetition rate. This can be realized by exciting different orders of solitons at different repetition rates in the delivery fiber 24. Since it is generally difficult to optimize the length of the delivery fiber 24 to simultaneously achieve the shortest pulses for different high-order solitons at the output of the delivery fiber 24, the imaging system 10 of the first embodiment may work best for two pulse repetition rates, namely, one rate for fundamental soliton and one rate for a high-order soliton. To achieve more than two pulse repetition rates having two-orders of soliton, the fluorescence imaging system 10 may be designed to include multiple delivery fibers offering more than two orders of solitons such as is shown in FIG. 2.

Figure 2:
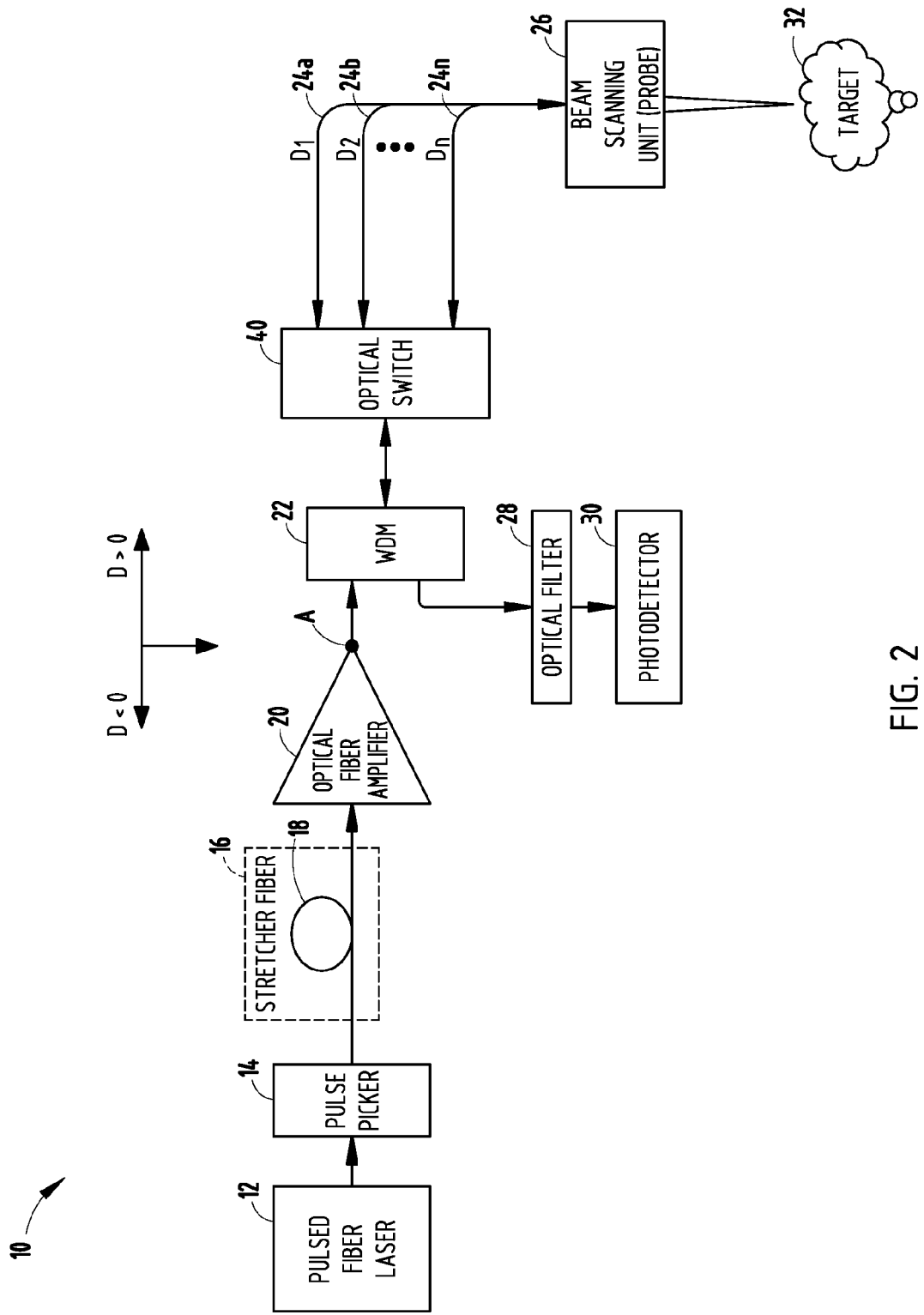
FIG. 2 is a schematic diagram of a fluorescence imaging system employing multiple pulse delivery fibers, according to a second embodiment.

Referring to FIG. 2, the fluorescence imaging system 10 is shown having components similar to those shown in FIG. 1 with the addition of an optical switch 40 and a plurality of optical delivery fibers 24a-24n, according to a second embodiment. The plurality (N) of delivery fibers 24a-24n are each configured with different positive dispersion parameters D1-Dn at the first wavelength and are used to deliver the laser pulses with different repetition rates and therefore different peak powers. An optical switch 40 is used to launch laser pulses of each repetition rate to the corresponding delivery fibers 24a-24n. Thus, the switch 40 may select laser pulses at the desired repetition rate dependent on which delivery fiber 24a-24n is selected. The optical switch 40, pulse picker 14 and amplifier 20, in addition to other components, may be controlled by control circuitry, such as a microprocessor, for example.

As can be seen from the above equations, the Nth order soliton power $P_{N-1}$ is linearly proportional to the absolute value of the fiber dispersion parameter. By properly choosing the dispersion parameter $D_1$-$D_n$ of the delivery fibers 24a-24n, pulses with different repetition rates or peak powers can excite fundamental or high-order soliton with different peak power in different delivery fibers 24a-24n. Thus, the laser pulses with different peak powers or repetition rates can be delivered to the target sample 32 by a number of delivery fibers 24a-24n. If the fundamental soliton delivery is used in all delivery fibers 24a-24n, the dispersion parameter and mode filed diameter (MFD) of each delivery fiber 24a-24n should be properly designed according to the pulse power to be delivered. An advantage in using fundamental soliton to deliver laser pulses is that the length of each delivery fiber 24a-24n may be less critical.

Figure 3:
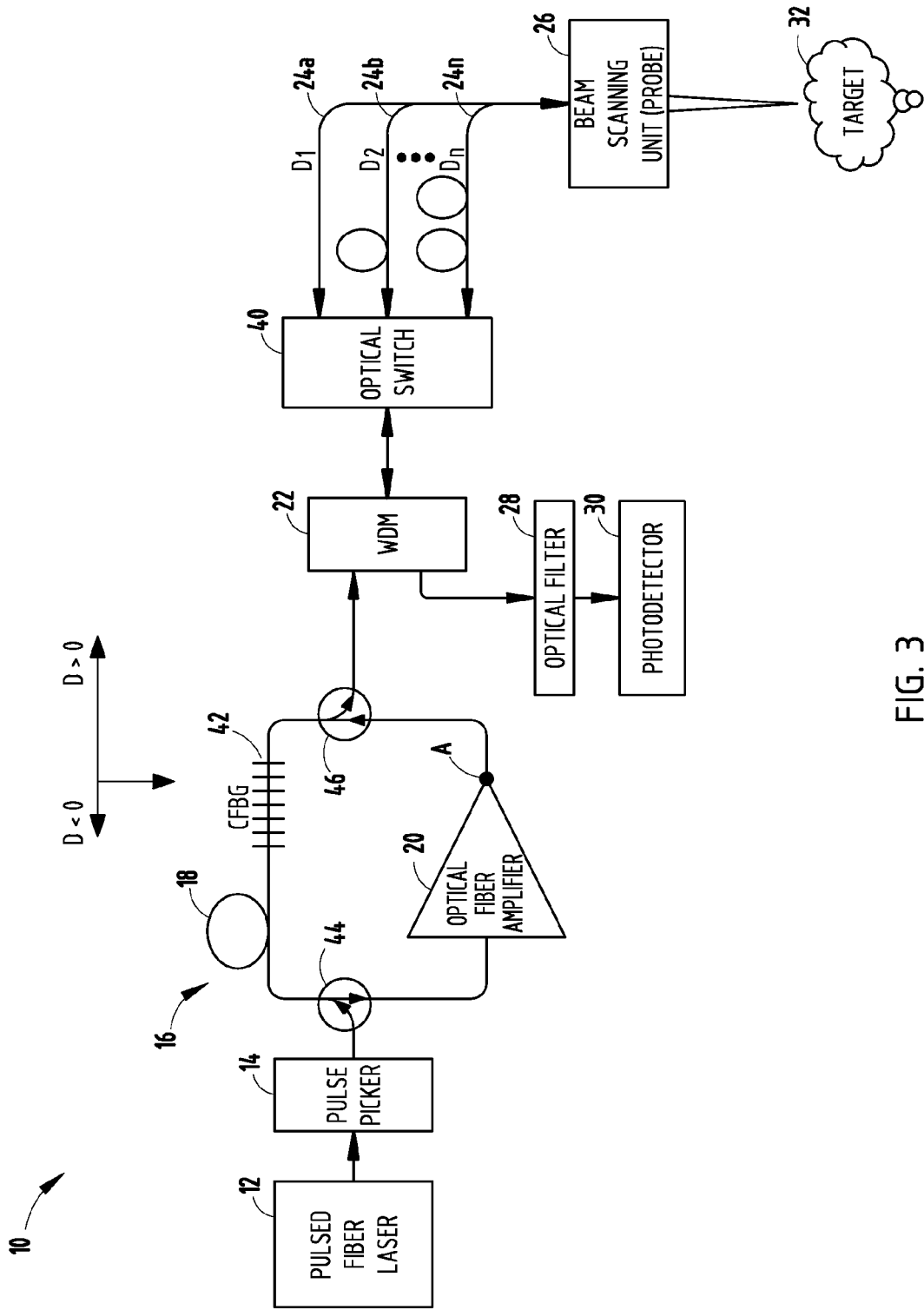
FIG. 3 is a schematic diagram of a fluorescence imaging system further employing optical circulators and a chirped fiber Bragg grating (CFBG), according to a third embodiment.

Referring to FIG. 3, the fluorescence imaging system 10 is shown employing a chirped fiber Bragg grating (CFBG) 42, according to a third embodiment. In this embodiment, first and second circulators 44 and 46 are also included which connect the optical fiber amplifier 20 in parallel with the stretcher fiber 18 and the CFBG 42. The CFBG 42 is used to stretch or compress the laser pulses. The stretcher 16 essentially is shown made of a piece of fiber 18 and the CFBG 42. The CFBG 42 also serves as a compressor to compensate the chirp of the laser pulses which may be introduced by itself. The orientation of the CFBG 42 is such that a positive chirp is produced when the laser pulses are stretched and a negative chirp is produced when the pulses are compressed. The reflectivity of the CFBG 42 is greater than ninety-nine (99) percent, according to one embodiment, and the reflection spectral bandwidth of the CFBG 42 covers the pulse spectral bandwidth.

The fluorescence imaging system 10 according to the third embodiment operates with the CFBG 42 as follows. The input laser pulses are launched into the stretcher 16 through the first optical circulator 44. The laser pulses are first stretched by the piece of stretch fiber 18 with a negative dispersion parameter at the first wavelength, and then are reflected and further stretched by the CFBG 42. The laser pulses pass through the stretcher fiber 18 and the first optical circulator 44, and are further stretched by the stretcher fiber 18 during the second pass. Then the stretched laser pulses are amplified by the optical fiber amplifier 20. The amplified laser pulses are sent to the CFBG 42 through the second circulator 46. Because the laser pulses pass through the CFBG 42 from the other side, the CFBG 42 can fully cancel the chirp of the laser pulses which is introduced by the CFBG 42 during the stretching process. Meanwhile, the CFBG 42 reflects the laser pulses back to the second circulator 46. Then, the laser pulses are sent to the WDM 22 and delivered to the target sample 32 via the optical switch 40 and selected pulse delivery fiber 24a-24n. In this embodiment, the fiber of the WDM 22 and the delivery fibers 24a-24n are configured with positive dispersion parameters at the first wavelength. In the aforementioned embodiments, the dispersion of the pulse stretcher 16 is generally fixed. Although the dispersion of the CFBG 42 in the third embodiment can be adjusted by stretching/compressing the grating, the tuning range of the dispersion is relatively small. As a result, there may be potential limitations on optimization of the stretcher parameters for different pulse repetition rates.

Figure 4:
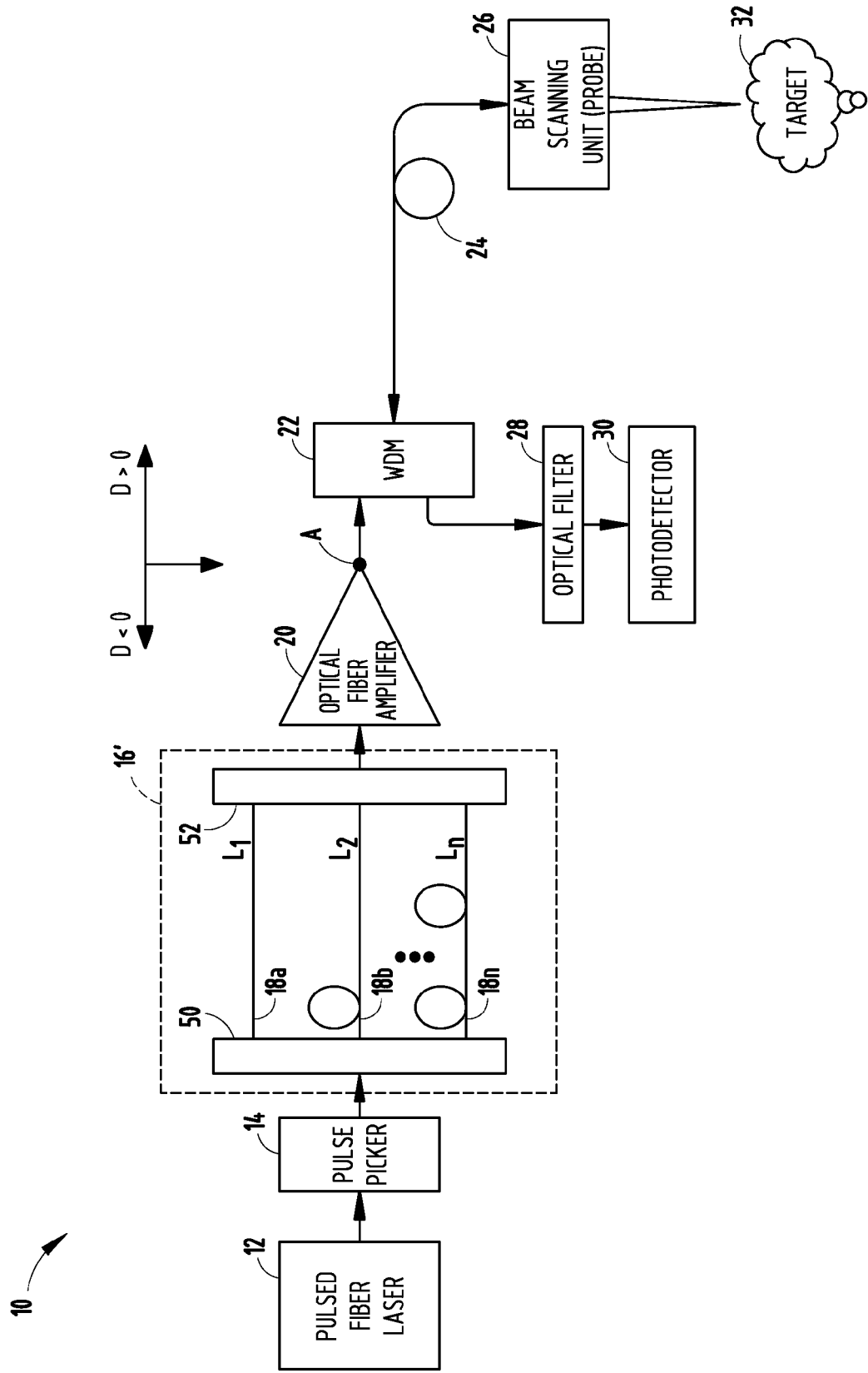
FIG. 4 is a schematic diagram of a fluorescence imaging system using a fiber based tunable stretcher, according to a fourth embodiment.

To alleviate some of the potential limitations, the fluorescence imaging system 10 may be configured to replace the fixed stretched with a dispersion adjustable stretcher 16' as shown in FIG. 4. The dispersion adjustable stretcher 16' includes two optical switches 50 and 52 and a plurality of stretcher fibers 18a-18n. The total dispersion of each stretcher fiber 18a-18n is optimized for one or more pulse repetition rates. The stretcher fibers 18a-18n have different lengths $L_1$-$L_n$ which adjust the amount of stretch in a given fiber. It should be appreciated that the optical switches 50 and 52 and other components may be controlled by control circuitry as should be evident to those skilled in the art.

Figure 5:
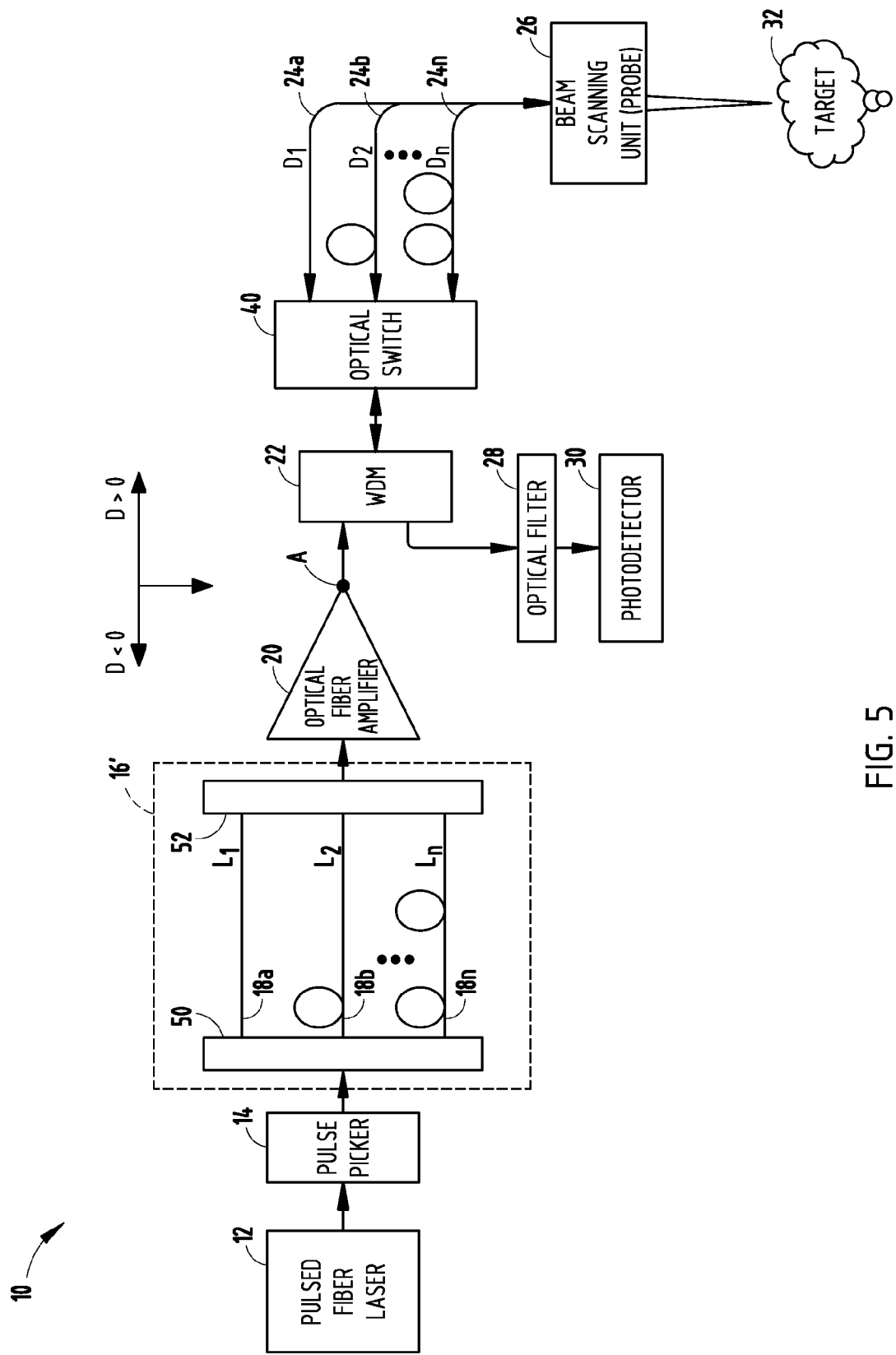
FIG. 5 is a schematic diagram of a fluorescence imaging system using a fiber based tunable stretcher and multiple delivery fibers, according to a fifth embodiment.

Referring to FIG. 5, a fluorescence imaging system 10 is shown employing the dispersion adjustable stretcher 16' in combination with multiple delivery fibers 24a-24n. In this embodiment, the parameters of each stretcher fiber 18a-18n and each delivery fiber 24a-24n are optimized for laser pulses with one repetition-rate. As such, laser pulses with various repetition rates can be efficiently delivered to the target sample 32 with minimized pulse degradation.

Figure 6:
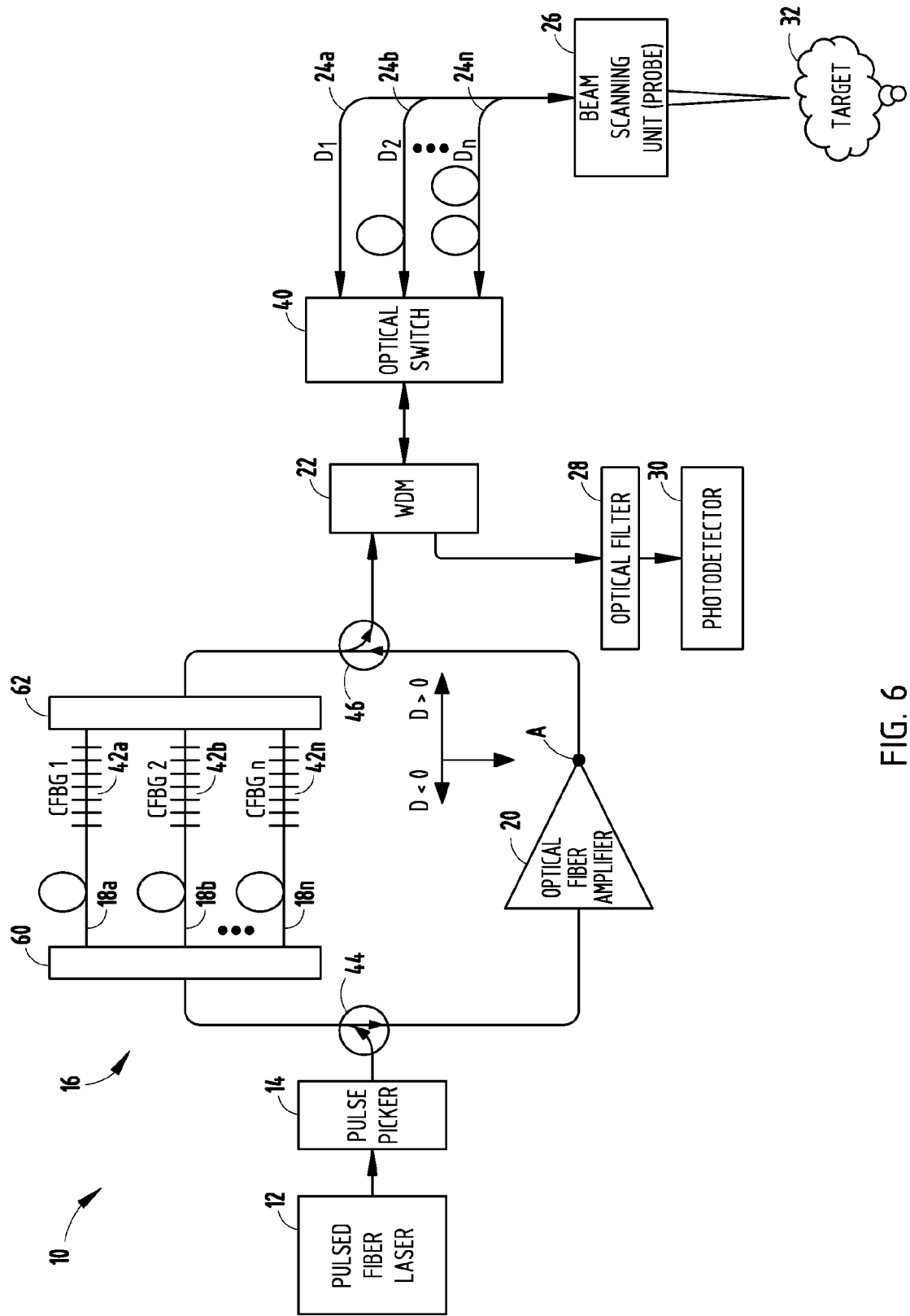
FIG. 6 is a schematic diagram of a fluorescence imaging system using a CFBG and fiber based tunable stretcher and multiple delivery fibers, according to a sixth embodiment.

Referring to FIG. 6, the fluorescence imaging system 10 is generally illustrated using multiple delivery fibers 24a-24c and a dispersion adjustable stretcher 16 with a plurality of CFBGs 42a-42n. In this embodiment, the CFBGs 42a-42n may be identical or may be configured differently. However, the reflectivity of all CFBGs 42a-42n are greater than ninety-nine (99) percent according to one embodiment for good efficiency and the reflection spectral bandwidth of all CFBGs 42a-42n fully covers the spectral bandwidth of the laser pulses.

Figure 7:
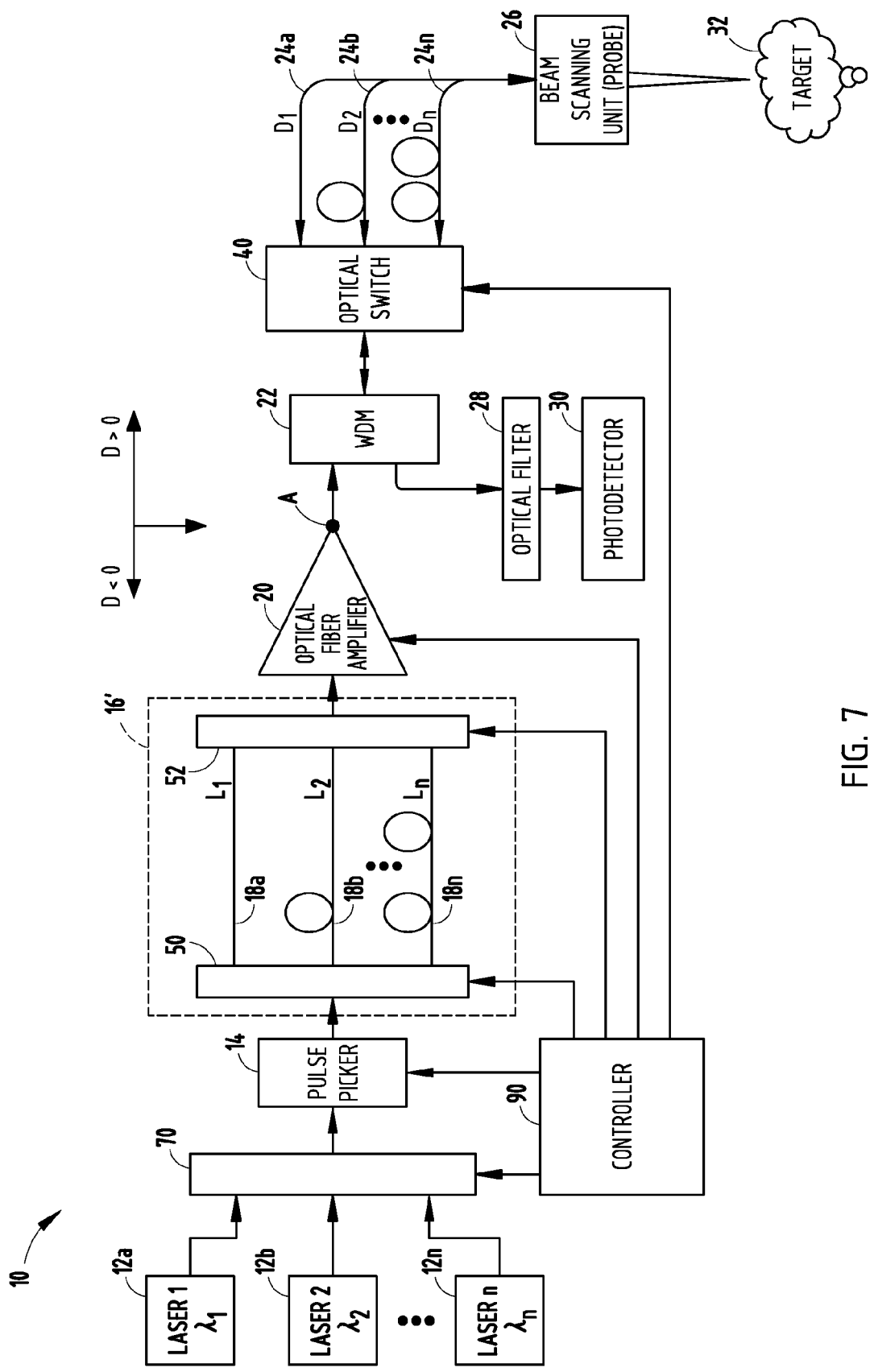
FIG. 7 is a schematic diagram of a fluorescence imaging system using multiple pulse lasers with different wavelengths, according to a seventh embodiment.

Referring to FIG. 7, the fluorescence imaging system 10 is illustrated employing multiple ultrashort pulsed fiber lasers 12a-12n with different center wavelengths $\lambda 1$-$\lambda n$ and an optical switch 70 to select from the lasers 12a-12n. The wavelength selective excitation of nonlinear fluorescence can enhance the ability of the imaging system 10 for some applications. In another embodiment, the multiple ultrashort pulse fiber lasers 12a-12n and the optical switch 70 may be replaced by a wavelength tunable ultrashort pulse fiber laser to generate a plurality of pulsed fiber laser outputs with different center wavelengths $\lambda 1$-$\lambda n$. FIG. 7 also illustrates the multiple laser sources 12a-12n at different wavelengths in combination with the fiber based tunable stretcher 16' and the plurality of pulse delivery fibers 24a-24n. In this embodiment, a controller 90 or other control circuitry is shown controlling the switches, pulse picker 14 and amplifier 20. It should be appreciated that control circuitry may be employed in the other embodiments. The optical switches and other electronics may be mounted onto an electronic control board which interfaces with the controller 90. The controller 90 may be implemented as a computer having a microprocessor and executing control software and switch a command to the switch board to change state of the switches. Additionally, the controller 90 can control the amplifier 20 to change the gain and can control the pulse picker 14 to adjust the reception rate.

Figure 8:
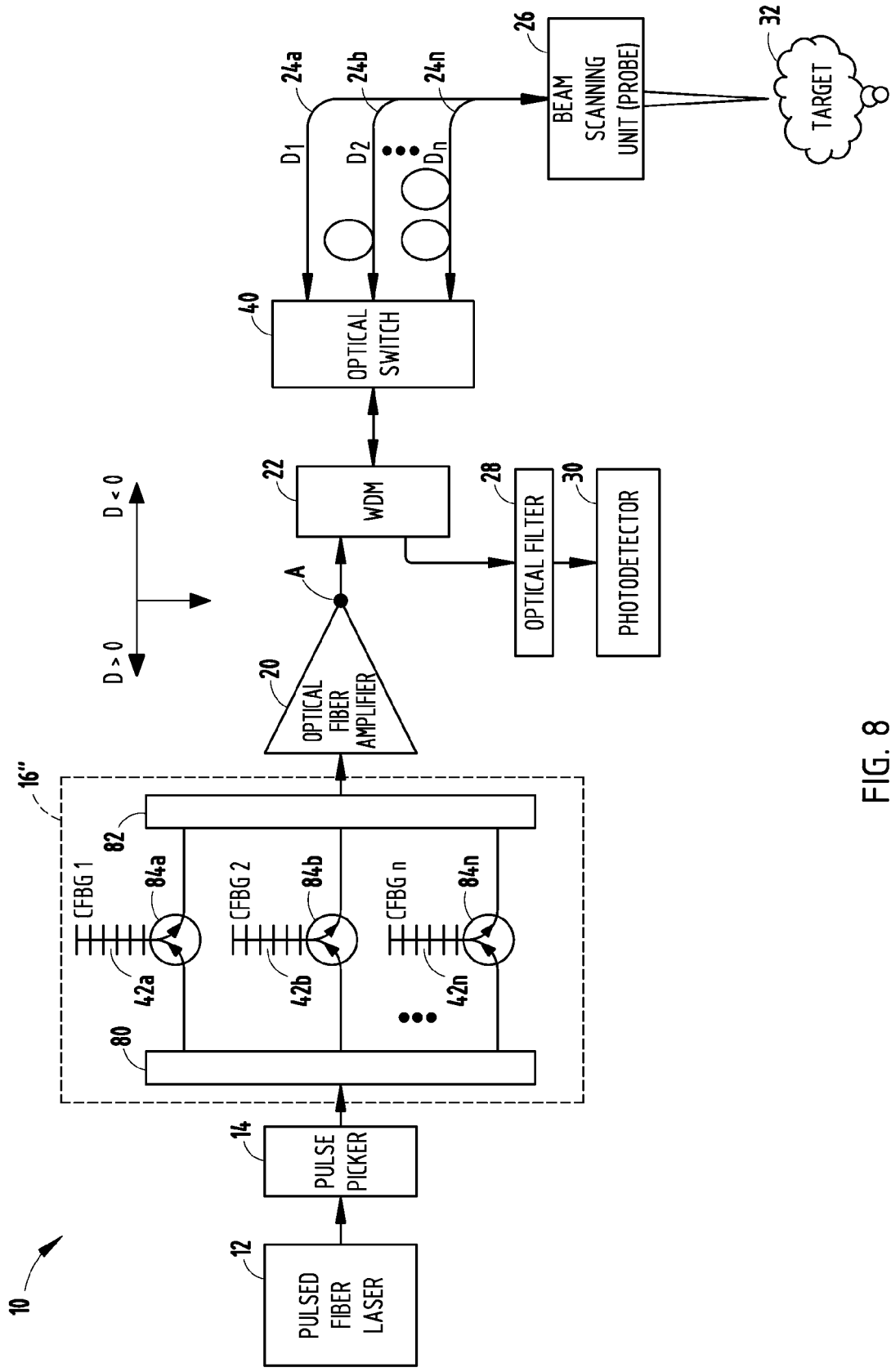
FIG. 8 is a schematic diagram of a fluorescence imaging system using negative dispersion fibers and a tunable fiber stretcher with positive dispersion, according to an eighth embodiment.

Referring to FIG. 8, the fluorescence imaging system 10 is illustrated according to an eighth embodiment in which a CFBG based tunable fiber stretcher 16" is employed. In this embodiment, the overall total dispersion of fibers used in the imaging system 10 prior to Point A is positive at the first wavelength, and the total dispersion of fibers after Point A is negative. The CFBGs 42a-42n introduce positive dispersion at the first wavelength to the laser pulses, resulting in a very low total dispersion to the imaging system 10. The reflectivity of all CFBGs 42a-42n is greater than ninety-nine (99) percent, and the reflection spectral bandwidth of all CFBGs 42a-42n fully covers the spectral bandwidth of the laser pulses. In this embodiment, since the laser pulses with each repetition rate are transmitted by an individual pair of CFBG and delivery fiber, the high power shortest pulsewidth laser pulses at each pulse repetition rate can be delivered to the target sample 32 by optimizing the dispersion of the corresponding CFBG and the length and/or the dispersion of the corresponding delivery fiber 24a-24n. It should be appreciated that other type tunable structures, such as a tunable stretcher based on a pair of defraction gratings with fiber, can also be employed in the imaging system 10. Additionally, fibers with positive dispersion made by using higher order mode designs or photonic crystal fiber designs can be used in place of the CFBGs according to other embodiments.

The fluorescence imaging system 10, according to the various embodiments disclosed herein, may be designed with system parameters as set forth below. The optical fibers employed in the imaging system 10 may be single mode fibers at the first wavelength(s) of the pulsed fiber laser(s). Prior to point A at the output of amplifier 20, the total dispersion of the fibers may be negative (except in the embodiment of the imaging system 10 shown in FIG. 8). Assuming the total length of the fibers from the fiber laser output to the output of the amplifier 20 at point A being length $L_1$ and the fiber dispersion distribution along the fibers being $D_1(z)$, the total dispersion $D_{t1}$ of the fibers from the output of the pulsed fiber laser 12 to point A may be represented by the following equation:

$$D_{t1} = \int_0^{L_1} D_1(z) dz$$

Prior to point A (left of point A in FIG. 1), the pulses propagate linearly in the fibers. The linear propagation can be achieved when the fiber and laser pulse parameters meet the following condition:

$$B = \frac{2\pi}{\lambda} \int_0^{L_1} n_2 I(z) dz < \pi,$$

Where B is the nonlinear phase shift, and wherein I(z) is the pulse peak intensity varying over the fiber length $L_1$. This condition can be met by properly controlling the output power of the pulsed laser 12 and selecting the dispersion of the stretcher 16. After the amplifier output at point A, the dispersion parameters of the fibers are positive (except in the embodiment of the imaging system shown in FIG. 8). Assuming fiber dispersion distribution allowing the fibers being $D_2(z) > 0$ and the total length of the fibers after the amplifier output at point A being $L_2 = L_{2a} + L_{2b}$ ($L_{2a}$ and $L_{2b}$ are the fiber lengths of the first and second parts of the fibers after point A, respectively), the total dispersion $D_{t-L_{2a}}$ of the first part of the fibers is defined by the following equation:

$$D_{t-L_{2a}} = \int_0^{L_{2a}} D_2(z) dz$$

Assuming that the output pulses of the pulsed fiber laser 12 is transform limited, the length and dispersion parameters of the first part of the fibers are selected to meet the following condition:

$$D_{t-L_{2a}} \approx D_{t1}$$

The length $L_{2b}$ of the second part of the fiber may meet the following condition:

$$L_{2b} > z_0 = \frac{0.32 \pi^2 c \tau^2}{\lambda^2 D_d},$$

where $D_d$ is the dispersion parameter of the second part fiber.

When fundamental soliton is used to deliver the pulses to the target sample 32, the peak power $P_0$ of the laser pulses at the input of the second part of the fibers may be defined by the following equation:

$$P_0 = \frac{\lambda^3 D_d A_{eff}}{1.28 \pi^2 c n_2 \tau^2}$$

When Nth order soliton is used to deliver the pulses to the target sample 32, the peak power $P_{N-1}$ of the pulses at the input of the second part of the fibers may be defined by the following equation:

$$P_{n-1} N^2 P_0$$

The length of the second part should be chosen such that the shortest pulsewidth of the laser pulses is achieved at the output of the delivery fiber 24. The above conditions can be achieved by properly setting the optical fiber amplifier 20.

EXAMPLES

Various embodiments will be further clarified by the following examples.

Example 1

The first example is based on the first embodiment of the imaging system 10 shown in FIG. 1. In this example, an Er-doped amplifier is used. Before point A, a same type of single mode fiber is used for the stretcher and other components. After point A, a single mode core double clad fiber is used for delivery fiber and other components. The parameters of the ultrashort pulsed fiber laser source 12 for this example are given in Table 1 below. The parameters of passive fibers and Er-doped fiber designed for this example are given in Table 2 below. Table 3 below shows the combination of the pulse repetition rates and peak powers which can be delivered to the target sample 32. The design in this example is able to deliver excitation pulses with a peak power up to 33.18 kW. When fundamental soliton is used to deliver laser pulses, the pulsewidth of the laser pulses delivered to the target sample 32 is about the same as the pulsewidth (e.g., 100 fs) of the output laser pulses of the pulsed fiber laser source 12, and the length of the delivery fiber 24 (including the fibers of all components after point A) can be any value longer than 115 m because of the fundamental soliton can keep its pulse sharp in the delivery fiber. When high-order solitons are used to deliver laser pulses, the pulsewidth of the pulses delivered to the target sample 32 is even smaller (e.g., 100 fs) than that of the output pulses of the pulsed fiber laser source 12 (depending on the soliton order), and the length of the delivery fiber 24 (including the fibers of all components after point A) should be longer than 115 m. The exact delivery fiber length is selected at the positions where the shortest pulses are achieved. These positions depend on the order of solitons. Therefore, this design is able to deliver 30 MHz fundamental soliton pulses and any one of the high-order soliton pulses with a soliton order up to eight.

TABLE 1

Parameters of the ultrashort pulse fiber laser

| Repetition rate (MHz) | Average power (mw) | Pulsewidth (fs) | Spectral width (nm) | Center wavelength (nm) |
|---|---|---|---|---|
| 30 | 4 | 100 | 25.2 | 1550 |

TABLE 2

Parameters of the fibers and amplifier

|  | Fiber between the output of the pulse laser and point A (excluding Er-doped fiber) | Er-doped fiber | Fibers between point A and the output of the delivery fiber |
|---|---|---|---|
| Length (m) | 19 | 1 | >115 |
| MFD (μm) | 5.6 | 6 | 10.4 |
| Gain (1/m) |  | 9 |  |
| Dispersion (ps/nm-km) @ 1550 nm | −105 | −17.5 | 17.5 |
| Numerical aperture of inner clad |  |  | >0.2 |

TABLE 3

Parameters of the pulses delivered to the target

| Pulse repetition rate (MHZ) | Soliton order | Pulse peak power delivered to the target (kW) |
|---|---|---|
| 30 | 1 | 4.9 |
| 7.5 | 2 | 19.5 |
| 3.33 | 3 | 43.8 |
| 1.88 | 4 | 77.9 |
| 1.2 | 5 | 121.8 |
| 0.83 | 6 | 175.4 |

TABLE 3-continued

Parameters of the pulses delivered to the target

| Pulse repetition rate (MHZ) | Soliton order | Pulse peak power delivered to the target (kW) |
|---|---|---|
| 0.61 | 7 | 238.7 |
| 0.47 | 8 | 331.8 |

Example 2

The second example is based on the third embodiment of the imaging system 10 shown in FIG. 3 in which CFBGs and multiple delivery fibers are used. In this example, four delivery fibers 24a-24d having four dispersions D1, D2, D3 and D4 are used. Each delivery fiber 24a-24d is able to deliver pulses with two different repetition rates (peak powers). Table 4 below lists the parameters of the fibers, amplifier and CFBG. The reflection bandwidth and reflectivity of the CFBG are approximately 25.2 nm and approximately 99%, respectively. Table 5 below shows the parameters of the output laser pulses when the fundamental and third order solitons are used. Each delivery fiber 24a-24d is able to deliver two different kinds of pulses: one is fundamental soliton, one is high-order soliton. For delivery fibers having dispersions D1 and D2, the order of soliton up to eight can be used. For delivery fibers having dispersions D3 and D4, the order of soliton up to five can be used.

TABLE 4

Parameters of the fibers, amplifier and CFBG

|  | Fiber between the output of the pulse laser and point A (excluding Er-doped fiber) | Stretcher fiber | Er-doped fiber | CFBG | Fiber after point A and before the optical switcher | Delivery fibers D1, D2 | Delivery fibers D3, D4 |
|---|---|---|---|---|---|---|---|
| Length (m) | 6 | 1 | 1 | 5.14 × 10−3 | 10.1 | >1 | >1 |
| MFD (μm) | 5.6 | 5.6 | 6 |  | 10.4 | 10.4 | 10.4 |
| Gain (1/m) |  |  | 9 |  |  |  |  |
| Dispersion (ps/nm-km) at 1550 nm | −20 | −20 | −17.5 | 17.5 | 17.5 | 17.5 | 35 |

TABLE 5

Parameters of the pulses delivery to the target

| Pulse repetition rate (MHZ) | Delivery fiber | Soliton order for pulse delivery | Peak power delivery to the target (kW) |
|---|---|---|---|
| 30 | D1 | 1 | 4.9 |
| 15 | D2 | 3 | 44.1 |
| 7.5 | D3 | 1 | 19.5 |
| 0.83 | D3 | 3 | 175.4 |

Accordingly, the fluorescence imaging system 10 efficiently delivers high peak power ultrashort pulses to the target sample 32 with suppressed pulse degradation. Additionally, the peak power and the repetition rate of the pulses of the fluorescence imaging system 10 can be adjusted. This provides for a deep imaging depth while maintaining a short measurement time. The imaging system 10 is particularly useful for use as a microscope or endoscope, according to a couple of examples.

It will be apparent to those skilled in the art that various modifications and variations can be made without departing from the spirit or scope of the claims.

What is claimed is:

1. A fluorescence imaging system comprising:
    a pulsed laser source for generating laser pulses at a first wavelength;
    an optical pulse stretcher comprising at least one optical pulse stretcher fiber having a first dispersion parameter at the first wavelength;
    a probe capable of interfacing with a sample to deliver the laser pulses and extract fluorescence signals excited by the laser pulses in the sample;
    at least one optical delivery fiber capable of delivering the laser pulses to the probe for delivery to the sample and collecting nonlinear fluorescence signals extracted from the sample by the probe, wherein the optical delivery fiber has a second dispersion parameter at the first wavelength, and wherein the second dispersion parameter has a polarity opposite the first dispersion parameter; and
    a detector capable of detecting images based on the collected fluorescence signals.

2. The imaging system as defined in claim 1, wherein the first dispersion parameter is negative at the first wavelength and the second dispersion parameter is positive at the first wavelength.

3. The imaging system as defined in claim 2, wherein a pulse repetition rate of the output pulses of the laser source is adjustable such that a change in pulse repetition rate executes different orders of solitons in the optical delivery fiber.

4. The imaging system as defined in claim 2, wherein the delivery fiber provides soliton pulses.

5. The imaging system as defined in claim 1, wherein the delivery fiber comprises a single mode core, an inner clad, and an outer clad structure, the core is used to deliver said laser pulses, and the inner cladding is used to collect said nonlinear fluorescence signals.

6. The imaging system as defined in claim 1 further comprising an optical fiber amplifier for amplifying the stretched laser pulses.

7. The imaging system as defined in claim 1, wherein the optical delivery fiber comprises a plurality of optical delivery fibers having a plurality of different dispersion parameters for supplying different peak powers.

8. The imaging system as defined in claim 1, wherein the stretcher comprises a chirped fiber Bragg grating for stretching and compressing the laser pulses.

9. The imaging system as defined in claim 1, wherein the stretcher comprises a dispersion adjustable stretcher comprising a plurality of different lengths of fiber for adjusting the amount of stretch.

10. The imaging system as defined in claim 1, wherein the laser pulses comprise a plurality of pulsed laser signals at different wavelengths.

11. The imaging system as defined in claim 1, wherein the optical stretcher is a single mode optical fiber and the optical delivery fiber comprises a single mode core.

12. The imaging system as defined in claim 1 further comprising a wavelength division multiplexer coupled to the optical delivery fiber for delivering the laser pulses at the first wavelength and collecting nonlinear fluorescence signals at a second wavelength.

13. The imaging system as defined in claim 1, wherein the imaging system is used in one of a microscope and an endoscope.

14. A method for generating fluorescence imaging, said method comprising the steps of
    generating laser pulses at a first wavelength with a pulsed laser;
    chirping the laser pulses with at least one optical pulse stretcher comprising an optical stretcher fiber having a first dispersion parameter at the first wavelength;
    delivering the laser pulses to a sample with at least one optical delivery fiber having a second dispersion parameter at the first wavelength to excite the sample, wherein the second dispersion parameter has a polarity opposite the first dispersion parameter;
    collecting nonlinear fluorescence signals excited in the sample; and
    delivering the collected fluorescence signals with the optical delivery fiber to a detector.

15. The method as defined in claim 14 further comprising the steps of detecting with the detector images based on the collected fluorescence signals.

16. The method as defined in claim 15, wherein the first dispersion parameter is negative at the first wavelength and the second dispersion parameter is positive at the first wavelength.

17. The method as defined in claim 16 further comprising the step of adjusting a repetition rate of the output pulses of the laser source, wherein a change in pulse repetition rate executes different orders of solitons in the optical delivery fiber.

18. The method as defined in claim 15 further comprising the step of amplifying the stretched laser pulses with an optical fiber amplifier.

19. The method as defined in claim 15, wherein the step of delivering the laser pulses to a sample comprises delivering the laser pulses on a plurality of optical delivery fibers having a plurality of dispersion parameters for supplying different peak powers.

20. The method as defined in claim 15 further comprising the step of coupling the delivery fiber to a wavelength division multiplexer for delivering the light pulses at the first wavelength and collecting nonlinear fluorescence signals at a second wavelength.

* * * * *